Oct. 23, 1928.
N. BENDIXEN
1,689,103
APPARATUS FOR MIXING LIQUIDS WITH SOLID OR SEMISOLID
SUBSTANCES OR WITH OTHER LIQUIDS
Filed Nov. 27, 1926
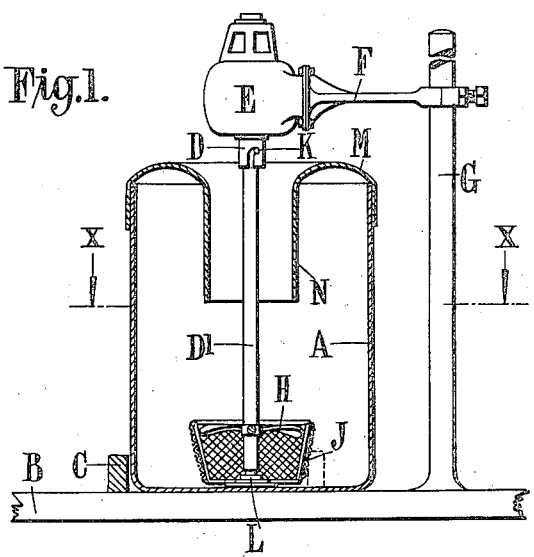
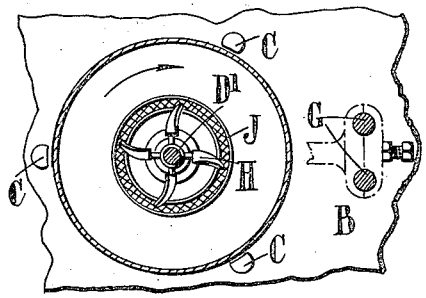
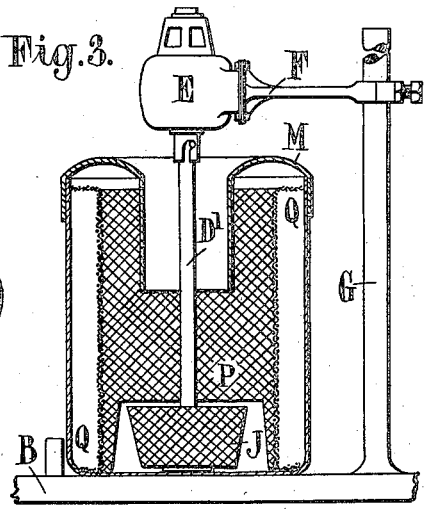
INVENTOR
Niels Bendixen
BY
James L. Norris
ATTORNEY Patented Oct. 23, 1928.

1,689,103

UNITED STATES PATENT OFFICE.

NIELS BENDIXEN, OF LONDON, ENGLAND, ASSIGNOR TO JOHN GODFREY YULE DELMAR MORGAN, OF LONDON, ENGLAND.

APPARATUS FOR MIXING LIQUIDS WITH SOLID OR SEMISOLID SUBSTANCES OR WITH OTHER LIQUIDS.

Application filed November 27, 1926, Serial No. 151,194, and in Great Britain May 25, 1926.

This invention relates to apparatus for mixing liquids with solid or semi-solid substances or with other liquids.

In preparing suspensions or intimate mixtures of fluids and finely divided solids, mechanical devices have been employed comprising a propeller that rotates in the mixture of fluid and solid matter and produces a suspension or the like by projecting the mixture at a high speed against and through a perforated screen, which screen can be variously shaped (e. g. corrugated, serrated, etc.), and which covers the inner walls of the vessel in which the mixture is contained and in which the suspension is formed.

Such a device is subject to the disadvantage that the high speed, at which the mixture necessarily leaves the propeller to enable a sufficiently fine suspension to be produced when the fluid is passed through the screen, is very considerably reduced by the reaction of the fluid, which at any given moment lies between the outer ends of the propeller blades and the screen and through which mass of fluid the new outwardly projected portion must pass before it reaches the screen, this retarding effect being a maximum at the parts of the corrugated or serrated perforated screen which lie farthest from the path of the propeller blades. The result is that an excessively high speed of the propeller is always necessary to produce a sufficiently fine suspension, i. e. to ensure that the fluid notwithstanding the interposed mass of fluid shall reach the screen at such a velocity that the required suspension is produced.

According to the present invention, the perforated screen, which is not undulated, serrated or the like, is made of tubular or like form, e. g. in the form of a cylinder, cone, hemisphere, or other suitable figure of revolution, and is mounted on the propeller and rotates with it within a receptacle for the liquid. The effect is, that when the mixture is projected outwards by the propeller and leaves the propeller blades, it has no distance to travel before it reaches the screen but passes immediately through the latter at substantially the same velocity as that imparted to it by the propeller, with the result that there is obained a hitherto unknown velocity of the mixture as it passes through the screen, whereby a perfect suspension is obtained either in much less time, or at a less propeller speed.

By giving the propeller blades a downward curve or rake, and by making the screen of suitable conical form and of suitable size, shape and pitch of perforation according to the different aims of the process, it is possible to apply a considerable pressure to the mixture of fluid and solid together with indrawn air within the cone and thus bring such mixture into a kind of "compressed" state as it passes through the screen. When the aerated mixture has passed through the perforations of the screen, the air in the mixture suddenly expands or "explodes", since it is liberated from the pressure above mentioned, and in so doing it promotes the breaking up of certain solids, as for instance fats, into minute particles, or the distribution of powders or liquids throughout the carrier liquid.

In the accompanying drawing, I have shown how my said invention may be conveniently and advantageously carried into practice. In this drawing, Figure 1 is a side elevation partly in vertical central section and Figure 2 a horizontal section on the line X—X, Figure 1, showing a mixing device constructed according to the invention.

Figure 3 is a similar view to Figure 1, illustrating a modification.

A is a cylindrical liquid receptacle, which is removably mounted on a base B between centering studs or brackets C, C, so as to stand coaxially with the shaft D, D' of an electric motor E that is mounted on an arm F adapted to be clamped at any desired height on a pair of uprights G fixed on the base B.

The shaft D, D' bears at its lower end a propeller H, to the blades of which is fixed a circular screen J of wire gauze in the form of a truncated cone open at the top and bottom. If desired, however the bottom of the cone may be closed by a disc or diaphragm of perforated material such as wire gauze. In order to facilitate the cleaning of the propeller and screen, the lower part or extension D' of the motor shaft is connected to the upper part D by means of a bayonet joint K, so as to permit of its being readily detached when desired. The lower end of the extension shaft D' is formed as a pivot adapted to rotate in a footstep bearing L mounted concentrically on the bottom of the vessel A.

The vessel A is provided with an annular cover M, which has a concentric inward extension N and is arched so as to facilitate the return, to the centre of the screen, of liquid forced rapidly up the outer walls of the vessel A by the central downward thrust on such liquid produced by the propeller H.

The tubular inward extension N of the cover M permits the ready introduction of liquids, fats, powders or the like from time to time during the operation of the device as found convenient, without any risk of liquid escaping. If necessary or desirable, the joint between the outer tubular part of the cover M and the outside of the vessel A may be rendered fluid tight by means of an elastic band of suitable india rubber. Other suitable means may however be employed for this purpose.

When the propeller H and screen J are rotated at a suitable speed, the liquid will be propelled downwards and outwards through the perforations of the rotating screen and thence up the inside of the peripheral wall of the vessel A and back into the upper open end of the screen J, into which it is drawn together with air by the reduced pressure in the centre of the screen due to the rapid outward movement of the liquid produced by the rotation of the propeller and screen.

By this means, the fluid pressure on the interior wall of the screen is considerable, so that the mixture of liquid and air is urged through the perforations with corresponding force. The mixture on passing through the perforations is released from this pressure, so that the compressed air therein expands and breaks the liquid or powder up into small particles and thereby promotes the formation of an emulsion or suspension.

In the modification shown in Figure 3, the vessel A is provided with a cylindrical lining P supported concentrically at a short distance from the inner wall of such vessel by distance pieces Q, Q in order to provide an annular passage for guiding the liquid mixture in its upward path. This lining is open at the bottom and top, so as to permit the entrance and exit of the annular liquid stream and may be perforated, as shown, or imperforate as desired. The lower edge of the screen P is advantageously arranged just above the upper edge of the rotary screen J as shown.

I claim:

1. A mixing device for liquids and other substances said device comprising a liquid container, a vertical shaft rotatably mounted in said container, a perforated screen in the form of a figure of revolution fixed on said shaft, a propeller mounted on said shaft in the interior of said screen to direct the substances to be mixed against the said perforated rotary screen, and a stationary perforated screen arranged within the container concentrically of the container and spaced from the wall of the latter.

2. A mixing device for liquids and other substances, said device comprising a liquid container, a vertical shaft rotatably mounted in said container, a perforated screen in the form of a figure of revolution mounted on said shaft and rotating therewith, a propeller mounted on said shaft in the interior of said screen, a stationary perforated screen arranged within the container concentrically of the container and spaced from the wall of the latter, and an annular cover for said liquid container, said cover having a tubular inward extension substantially concentric with the rotary shaft, and of such diameter to leave an annular space between its inner wall and said shaft.

3. A mixing device for liquids and other substances, said device comprising a liquid container, a shaft rotatably mounted in said container, a tubular screen mounted concentrically on said shaft and rotatable therewith, a propeller mounted on said shaft, and a stationary perforated screen arranged concentrically within the container at a short distance from the wall of such container.

4. A mixing device for liquids and other substances, said device comprising a liquid container, a shaft rotatably mounted in said container, a tubular perforated screen mounted concentrically on said shaft and rotatable therewith, a propeller mounted on said shaft, a stationary perforated screen arranged concentrically within the container at a short distance from the wall of such container, and an annular cover for said liquid container, said cover having a tubular inward extension substantially concentric with the rotary shaft, and situated between said shaft and said stationary screen.

5. A mixing device for liquids and other substances, said device comprising a liquid container, a vertical shaft rotatably mounted in said container, a truncated conical screen of wire gauze with open ends concentrically mounted on said shaft and rotatable therewith, and a propeller arranged within the larger end of the screen and adapted to impel the liquid and solid substances carried thereby against the interior of the wire gauze screen.

6. A mixing device for liquids and other substances, said device comprising a liquid container, a vertical shaft rotatably mounted in said container, a truncated conical screen of wire gauze with open ends concentrically mounted on said shaft and rotatable therewith, a propeller arranged within the larger end of the screen to impel the liquid and solid substances carried thereby against the interior of the wire gauze screen, a stationary perforated screen arranged concentrically within the container at a short distance from the wall of the said container, an annular cover for said liquid container, and a tubular extension on said cover, said extension surrounding the rotatable shaft and being of such diameter as to leave a clear annular space between its inner wall and said shaft.

7. A mixing device for liquids and other substances, said device comprising a liquid container, a vertical shaft rotatably mounted in said container, an open ended truncated conical screen of wire gauze concentrically mounted on said shaft and rotatable therewith, a propeller arranged within the larger end of the screen and adapted to impel the liquid and solid substances carried thereby against the interior of the wire gauze screen, and a stationary perforated screen arranged concentrically within the container at a short distance from the wall of said container.

NIELS BENDIXEN.